United States Patent
Konishi et al.

(10) Patent No.: US 9,556,355 B2
(45) Date of Patent: Jan. 31, 2017

(54) PAINT COMPOSITIONS, METHOD OF PAINT FINISHING AND PAINTED OBJECTS

(75) Inventors: Tetsu Konishi, Kanagawa (JP); Machiko Okada, Yokohama (JP); Rui Nimi, Munster (DE)

(73) Assignee: BASF COATING GmbH, Muenster-Hiltrup (DE)

(*) Notice: Subject to any disclaimer, the term of this patent is extended or adjusted under 35 U.S.C. 154(b) by 1499 days.

(21) Appl. No.: 12/095,369

(22) PCT Filed: Nov. 10, 2006

(86) PCT No.: PCT/IB2006/003326
§ 371 (c)(1),
(2), (4) Date: Sep. 3, 2008

(87) PCT Pub. No.: WO2007/063382
PCT Pub. Date: Jun. 7, 2007

(65) Prior Publication Data
US 2009/0001331 A1   Jan. 1, 2009

(30) Foreign Application Priority Data

Nov. 29, 2005 (JP) ................. 2005-343227

(51) Int. Cl.

| | | |
|---|---|---|
| *C09D 133/06* | (2006.01) | |
| *C08G 59/42* | (2006.01) | |
| *C09D 163/00* | (2006.01) | |
| *C08L 33/02* | (2006.01) | |
| *C08L 33/06* | (2006.01) | |
| *C08L 63/00* | (2006.01) | |

(52) U.S. Cl.
CPC ............ *C09D 133/06* (2013.01); *C08G 59/42* (2013.01); *C09D 163/00* (2013.01); *C08L 33/02* (2013.01); *C08L 33/06* (2013.01); *C08L 63/00* (2013.01)

(58) Field of Classification Search
CPC .................................................. C09D 133/06
USPC ........................................................ 252/589
See application file for complete search history.

(56) References Cited

U.S. PATENT DOCUMENTS

| | | | |
|---|---|---|---|
| 5,739,216 A | 4/1998 | Duecoffre et al. | |
| 2002/0081391 A1* | 6/2002 | Baumbach et al. | 427/508 |
| 2003/0175436 A1* | 9/2003 | Honda et al. | 427/385.5 |
| 2004/0171867 A1* | 9/2004 | Okazaki | 560/183 |
| 2004/0209083 A1* | 10/2004 | Hu et al. | 428/413 |
| 2004/0242806 A1* | 12/2004 | Yamada et al. | 525/451 |
| 2006/0124225 A1* | 6/2006 | Wu et al. | 156/108 |
| 2007/0218274 A1* | 9/2007 | Kania et al. | 428/332 |
| 2007/0298178 A1* | 12/2007 | Tanabe et al. | 427/372.2 |
| 2009/0205769 A1* | 8/2009 | Wu et al. | 156/108 |

FOREIGN PATENT DOCUMENTS

| | | |
|---|---|---|
| DE | 4416281 | 11/1995 |
| JP | 5171103 A | 7/1993 |
| JP | 9104803 A | 4/1997 |
| JP | 2002167426 | 6/2002 |

OTHER PUBLICATIONS

International Preliminary Report on Patentability for International application No. PCT/IB2006/003326 dated Jun. 30, 2008.
International Search Report Dated Nov. 10, 2006, International Application No. PCT/IB2006/003326.
Written Opinion of International Searching Authority Dated Nov. 10, 2006, International Application No. PCT/IB2006/003326.

* cited by examiner

*Primary Examiner* — Megan McCulley
(74) *Attorney, Agent, or Firm* — Oblon, McClelland, Maier & Neustadt, L.L.P.

(57) ABSTRACT

Disclosed herein is a paint composition comprising a carboxyl group containing resin comprising two or more carboxyl groups per molecule, having an acid number of from 100 to 300 mgKOH/g and a weight average molecular weight of from 2,000 to 30,000, obtained by the copolymerization of a carboxyl group containing radically polymerizable monomer and another radically polymerizable monomer, wherein the carboxyl group containing resin comprises 5 to 50 weight percent of structural units based on a lactone compound, based on resin solids; an epoxy group containing resin, comprising two or more epoxy groups per molecule; an ultraviolet absorber; and a light stabilizer having a pKb value of at least 9; wherein the molar ratio of the carboxyl groups of the carboxyl group containing resin to the epoxy groups of the epoxy group containing resin is 3:1 to 1:3.

10 Claims, No Drawings

PAINT COMPOSITIONS, METHOD OF PAINT FINISHING AND PAINTED OBJECTS

CROSS REFERENCE TO RELATED APPLICATIONS

This Application is the National Stage of International Application No. PCT/IB2006/003326, filed Nov. 10, 2006, which claims priority to Japanese Application No. 2005-343227, filed Nov. 29, 2005.

TECHNICAL FIELD

The invention concerns novel paint compositions, a method of paint finishing and the resulting painted objects. More precisely, the invention concerns paint compositions with which paint films which have excellent weather resistance, acid resistance and base concealing properties in respect of the fine roughness of the surface of the object being painted can be obtained in the automobile painting field, a method of paint finishing in which these paint compositions are used, and the resulting painted objects.

BACKGROUND

A demand has arisen in the automobile painting field in recent years for providing paint films with top-coat paints which have a high level of weather resistance, acid resistance and an excellent appearance, and which have storage stability which is adequate for withstanding use with circulation.

Methods involving the inclusion of ultraviolet absorbers and light stabilizers in the paint film are generally used to improve weather resistance, and in terms of the base concealing properties there is little shrinkage on hardening with the addition reaction hardening systems where no eliminated material is produced and the base concealing properties are excellent, and in terms of the acid resistance techniques involving the use of acid/epoxy crosslinking and hydroxyl group/isocyanate crosslinking are known, but with hydroxyl group/isocyanate crosslinking the reactivity at low temperatures is very high and it is impossible to make use of a one-liquid type paint. Furthermore, crosslinking using a blocked isocyanate is also known, but in this case the blocking groups are eliminated at the time of the reaction and the shrinkage on hardening is considerable and adequate base concealing properties are not obtained. Furthermore, in the case of acid/epoxy crosslinking as well the storage stability at low temperature is poor and its use in a one-liquid type paint is limited.

Paint compositions comprising acrylic copolymer obtained by copolymerizing a lactone-modified carboxyl group containing monomer, an epoxy group containing acrylic copolymer and an amino resin have been reported as a technique in which acid/epoxy crosslinking is used (for example, see Japanese Unexamined Patent Application Laid Open H5-171103). However, here again adequate storage stability as a one-liquid type paint is not obtained since an amino resin is used in these paint compositions.

Moreover, paint compositions comprising acrylic polycarboxylic acid, polyepoxide and antioxidant (for example, see Japanese Unexamined Patent Application Laid Open H9-104803) and paint compositions which contains structural units based on a carboxyl group containing low-lactone-modified hydroxy(meth)acrylate and a polyepoxide (for example, see Japanese Unexamined Patent Application Laid Open 2002-167426) are known, but in these cases again adequate storage stability as a one-liquid type paint is not obtained because the acid/epoxy reactivity is not suppressed.

[Patent Citation 1]
Japanese Unexamined Patent Application Laid Open H5-171103
[Patent Citation 2]
Japanese Unexamined Patent Application Laid Open H9-104803
[Patent Citation 3]
Japanese Unexamined Patent Application Laid Open 2002-167426

SUMMARY

The present invention is intended to provide paint compositions with which paint films which have excellent weather resistance, acid resistance and base concealing properties in respect of the fine roughness of the surface of the object which is being painted are obtained, a method of paint finishing in which these paint compositions are used, and the resulting painted objects.

As a result of thorough research carried out with a view to resolving the abovementioned problems, the inventors have discovered that the abovementioned objective can be realized by using a paint composition which contains a carboxyl group containing resin which is a radically copolymerized resin which includes at least two carboxyl groups in one molecule, which has a specified content of structural units based on a lactone compound and which has a specified acid value and a specified weight average molecular weight, and which contains an epoxy group containing resin which has at least two epoxy groups in one molecule in a specified proportion as the base resin, and which also contains an ultraviolet absorber and a light stabilizer which has a specified basicity, and the invention has been realized on the basis of these findings.

That is to say, the invention provides a paint composition which contains as essential components (A) a carboxyl group containing resin obtained by the copolymerization of a carboxyl group containing radically polymerizable monomer and other radically polymerizable monomer in which two or more carboxyl groups are included in one molecule and of which the acid value is from 100 to 300 mgKOH/g and the weight average molecular weight is from 2,000 to 30,000, and wherein from 5 to 50 mass % of structural units based on a lactone compound are included in the resin solid fraction, (B) an epoxy group containing resin where two or more epoxy groups are included in one molecule, (C) an ultraviolet absorber and (D) a light stabilizer of which the basicity (pKb) is at least 9, and in which the proportions as a mol ratio of the carboxyl groups of the (A) component and the epoxy groups of the (B) component are within the range from 75/25 to 25/75.

Furthermore, the invention provides a paint composition in which, in the abovementioned paint composition, at least 50% of all of the carboxyl groups of the aforementioned (A) component are carboxyl groups originating from acrylic acid and/or methacrylic acid.

Furthermore, the invention provides a paint composition in which, in the abovementioned paint compositions, the epoxy group containing resin of the aforementioned (B) component is an epoxy group containing resin comprising a copolymer which contains structural units based on an epoxy group containing radically polymerizable monomer and of which the epoxy value is from 100 to 300 mgKOH/g and the weight average molecular weight is from 1,000 to 30,000.

Furthermore, the invention provides a paint composition in which, in the abovementioned paint compositions, the epoxy group containing resin of the aforementioned (B) component is an epoxy group containing resin which contains hydroxyl groups originating from a hydroxyl group containing radically polymerizable monomer and which has a hydroxyl group value of not more than 100 mgKOH/g.

Furthermore, the invention provides a paint composition in which, in the abovementioned paint compositions, there is included (E) a carboxyl group containing resin which contains two or more carboxyl groups in one molecule (but excluding the (A) component) of which the acid value is from 100 to 800 mgKOH/g and the weight average molecular weight is from 200 to 30,000, in which the proportions of the (A) component and the (E) component as the mass ratio of the resin solid fractions are from 99/1 to 50/50, and in which the proportions as a mol ratio of the carboxyl groups of the (A) and (E) components and the epoxy groups of the (B) component are within the range from 75/25 to 25/75.

Furthermore, the invention provides a paint composition in which, in the abovementioned paint compositions, there is also included (F) a tris(alkoxycarbonylamino)triazine and/or a blocked isocyanate compound in an amount of less than 20 mass % with respect to the solid fractions of all of the resins.

Moreover, there are also provided a method of paint finishing in which the abovementioned paint compositions are applied, and painted objects which have been painted with the abovementioned method of paint finishing.

The paint compositions of this invention can provide paint films which have excellent weather resistance, acid resistance and base concealing properties in respect of the fine roughness of the surface of the object which is being painted, and they have adequate storage stability as one-liquid type paints.

DETAILED DESCRIPTION

The (A) component used in the invention is a carboxyl group containing resin of acid value from 100 to 300 mgKOH/g and weight average molecular weight from 2,000 to 30,000. The preferred range for the acid value of the (A) component is from 110 to 250 mgKOH/g, and the most desirable range is from 120 to 200 mgKOH/g. In those cases where the acid value is less than 100 mgKOH/g the paint film obtained lacks hardness and in those cases where it exceeds 300 mgKOH/g the compatibility with the other resins declines and the appearance of the paint film is poor. Furthermore, the preferred range for the weight average molecular weight of the (A) component is from 2,500 to 20,000, and the most desirable range is from 2,500 to 15,000. In those cases where the weight average molecular weight is less than 2,000 the paint film obtained lacks hardness, and in those cases where it exceeds 30,000 the compatibility with the other resins declines and the appearance of the paint film is poor.

The (A) component is a copolymer resin which contains two or more carboxyl groups in one molecule which has been obtained by copolymerizing a carboxyl group containing radically polymerizable monomer with another radically polymerizable monomer.

Actual examples of the carboxyl group containing radically polymerizable monomers which can be used to produce the (A) component include acrylic acid, methacrylic acid, maleic acid, fumaric acid, citraconic acid and itaconic acid. One of these carboxyl group containing radically polymerizable monomers can be used, or a combination of two or more types can be used, but at least 50%, preferably at least 55% and most desirably at least 60% of all of the carboxyl groups of the (A) component are carboxyl groups originating from acrylic acid and/or methacrylic acid. In those case where less than 50% of all of the carboxyl groups of the (A) component are carboxyl groups originating from acrylic acid or methacrylic acid the reactivity of the carboxyl groups is too high and the storage stability is poor.

Actual examples of the other radically polymerizable monomers which can be used to produce the (A) component include methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate, stearyl methacrylate, styrene, acrylonitrile, methacrylonitrile, acrylamide and methacrylamide. One of these radically polymerizable monomers can be used, or a combination of two or more types can be used.

Furthermore, the (A) component includes within the resin structural units based on a lactone compound. The inclusion of the structural units based on a lactone compound in the resin can be achieved, for example, with a method in which side chain terminal carboxyl groups are extended by the addition of a lactone compound to the abovementioned carboxyl groups to include structural units based on a lactone compound in the resin. In this case the carboxyl groups avoid the steric hindrance of the side chains originating from other radically polymerizable monomers and it has the advantage or raising the reactivity.

Examples of said lactone compounds include those which have a four to fourteen membered ring structure and those which have a four to fourteen membered ring structure which are substituted on the ring with from one to three, and preferably with one, alkyl group which has from 1 to 5 carbon atoms, and actual examples include β-methyl-δ-valerolactone, γ-valerolactone, δ-valerolactone, δ-caprolactone, γ-caprolactone, ε-caprolactone, β-propiolactone, γ-butyrolactone, γ-nonanoiclactone and δ-decanolactone, and ε-caprolactone is especially desirable. One type of lactone compound can be used, or a combination of two or more types can be used.

Moreover, the lactone compound, such as ε-caprolactone, adducts of (meth)acrylic acid hydroxy-lower-alkyl esters such as 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate and 4-hydroxybutyl methacrylate can also be obtained commercially as lactone compounds, but they do not contribute to raising the reactivity of the carboxyl group which is the aim of the present invention.

Said lactone compounds are used in such a way that the content of structural units based on a lactone compound is within the range from 5 to 50 mass % of the resin solid fraction which is the (A) component, but they are preferably used in such a way that said content is from 5 to 40 mass %, and most desirably they are used in such a way that said content is from 5 to 30 mass %. In those cases where the content of said structural units based on a lactone compound exceeds 50 mass % the crystallinity of the resin is raised and it is precipitated out in the paint, and in those cases where the content of said structural units based on a lactone compound is less than 5 mass % the reactivity is reduced and the paint film obtained lacks hardness.

The addition reaction of said lactone compound on the carboxyl group containing radically polymerizable monomer may be carried out after copolymerization reaction of the carboxyl group containing radically polymerizable monomer and other radically polymerizable monomer or at the same time as this reaction.

The radical copolymerization for producing the (A) component the carboxyl group containing resin can be carried out by means of the known radical copolymerization methods. The usual radical polymerization initiators can be used for the radical copolymerization. Examples of these radical polymerization initiators include azo compounds such as 2,2'-azobisisobutyronitrile, 2,2'-azobis-2,4-dimethylvaleronitrile, 4,4'-azobis-4-cyanovaleric acid, 1-azobis-1-cyclohexanecarbonitrile and dimethyl-2,2'-azobis-isobutyrate, and organic peroxides such as methyl ethyl ketone peroxide, cyclohexanol peroxide, 3,5,5-trimethylhexanone peroxide, 1,1-bis(t-butylperoxy)-3,3,5-trimethylcyclohexane, 1,1-bis(t-butylperoxy)-cyclohexane, 2,2-bis(t-butylperoxy)octane, t-butylhydroperoxide, diisopropylbenzenehydroperoxide, dicumylperoxide, t-butylcumylhydroperoxide, isobutyl peroxide, lauroyl peroxide, benzoyl peroxide, diisopropyl peroxycarbonate, t-butylperoxy 2-ethylhexanoate, t-butylperoxy neodecanate, t-butylperoxy laurate, t-butylperoxy benzoate and t-butylperoxy isopropyl carbonate.

One type of radical polymerization initiator can be used, or a combination of two or more types can be used.

No particular limitation is imposed upon the amount of radical polymerization initiator which is used, but an amount of from 0.01 to 20 mass % with respect to the total amount of radically polymerizable monomer is preferred.

Reducing agents such as dimethylaniline, ferrous salts such as ferrous sulfate, ferrous chloride and ferrous acetate, and acidic sodium sulfite, sodium thiosulfate and Rongalite, for example, can be combined, as required, with these radical polymerization initiator systems, but they must be selected with care so that the polymerization temperature is not too low.

The organic solvents which can be used in the production of the (A) component carboxyl group containing resins of this invention are preferably solvents which do not have a functional group which react with carboxyl groups. Examples of suitable organic solvents which can be used include aliphatic hydrocarbons such as cyclohexane and ethylcyclohexane, aromatic hydrocarbon solvents such as toluene, xylene, ethylbenzene and aromatic naphtha, ketone solvents such as acetone, methyl ethyl ketone, methyl isobutyl ketone, cyclohexanone and isopherone, ester-based solvents such as ethyl acetate, n-butyl acetate, isobutyl acetate, 3-methoxybutyl acetate and bis(2-ethylhexyl) adipate, ether based solvents such as dibutyl ether, tetrahydrofuran, 1,4-dioxane and 1,3,5-trioxane, and nitrogen-containing solvents such as acetonitrile, valeronitrile, N,N-dimethylformamide and N,N-diethylformamide. One type of organic solvent can be used, or a solvent mixture comprising a plurality of two or more types can be used. Furthermore, the solid fraction concentration of the (A) component carboxyl group containing resin can be selected within the range where the dispersion stability of the resin is not lost, and generally this solid fraction concentration is from 10 to 70 mass %.

The polymerization temperature of the abovementioned polymerization reaction differs according to the type of radical polymerization initiator, whether or not a reducing agent is being used conjointly, and whether or not a reaction catalyst for the carboxyl groups and epoxy groups is present, but the reaction is preferably carried out under temperature conditions from 50 to 200° C., and most desirably under temperature conditions from 80 to 160° C. In those cases where the reaction temperature is less than 50° C. the radical polymerization reaction does not proceed satisfactorily, while on the other hand in those cases where the reaction temperature exceeds 200° C. side reactions such as unanticipated depolymerization occur.

In this invention the epoxy group containing resin which has two or more epoxy groups in one molecule which is used for the (B) component can be obtained in practical terms, for example, by the copolymerization of an epoxy group containing radically polymerizable monomer with another radically polymerizable monomer.

Actual examples of the epoxy group containing radically polymerizable monomers include glycidyl acrylate, glycidyl methacrylate, 3,4-epoxycyclohexylmethyl acrylate and 3,4-epoxycyclohexylmethyl methacrylate, and one of these monomers can be used, or a combination of two or more type can be used.

The aforementioned other radically polymerizable monomers used in the production of the (A) component can be cited as the other radically polymerizable monomers. One other radically polymerizable monomer can be used, or a combination of two or more types can be used.

The epoxy value of the (B) component epoxy group containing resin is preferably from 100 to 300 mgKOH/g, more desirably from 120 to 270 mgKOH/g, and most desirably from 140 to 250 mgKOH/g. In those cases where the epoxy value is less than 100 mgKOH/g the hardness of the paint film which is obtained is reduced and in those cases where it exceeds 300 mgKOH/g the compatibility with the (A) component carboxyl group containing resin is reduced and the appearance of the paint film is poor. Furthermore, the weight average molecular weight of the (B) component epoxy group containing resin is preferably from 2,000 to 30,000, more desirably from 2,500 to 20,000, and most desirably from 2,500 to 15,000. In those cases where the weight average molecular weight is less than 2,000 the hardness of the paint film which is obtained is reduced and in those cases where it exceeds 30,000 the compatibility of the (A) component carboxyl group containing resin is reduced and the appearance of the paint film is poor.

Furthermore, the epoxy group containing resin which is used as the (B) component of this invention may contain hydroxyl groups. The (B) component epoxy group containing resins which contain hydroxyl groups can be produced, for example, by copolymerizing hydroxyl group containing radically polymerizable monomers with the aforementioned radically polymerizable monomers which are used to produce the (B) component epoxy group containing resins. The introduction of hydroxyl groups into the (B) component epoxy group containing resin has not only the effect of raising the compatibility with the other resins without changing the polarity of the highly polar carboxyl group containing resin but also has the effect in those cases where it is used as a top coat paint of improving the strength of attachment at the interface as it also reacts with the cross-linking agent which is included in the underlying base-coat paint.

Examples of the radically polymerizable monomers which contain hydroxyl groups include 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, 4-hydroxybutyl methacrylate, acrylic acid and versatic acid glycidyl ester adduct, methacrylic acid and versatic acid glycidyl ester adduct, and ethylene oxide and/or propylene oxide adducts of (meth)acrylic acid hydroxyalkyl esters such as 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate and 4-hydroxybutyl methacrylate. One or a combination of two or more radically polymerizable monomers which contain hydroxyl groups can be used.

The hydroxyl group value of the (B) component epoxy group containing resin is preferably not more than 100 mgKOH/g, more desirably not more than 80 mgKOH/g and most desirably not more than 60 mgKOH/g. In those cases where the hydroxyl group value of the (B) component epoxy group containing resin exceeds 100 mgKOH/g the hydrophilicity of the pint film is increased and the water resistance is poor.

The organic solvent which is used in the production of the (B) component epoxy group containing resin of this invention is preferably a solvent which does not have a functional group which reacts with epoxy groups and hydroxyl groups, and examples of suitable solvents include aliphatic hydrocarbons such as cyclohexane and ethylcyclohexane, aromatic hydrocarbon solvents such as toluene, xylene, ethylbenzene and aromatic naphtha, ketone solvents such as acetone, methyl ethyl ketone, methyl isobutyl ketone, cyclohexanone and isopherone, ester-based solvents such as ethyl acetate, n-butyl acetate, isobutyl acetate, 3-methoxybutyl acetate and bis(2-ethylhexyl) adipate, ether based solvents such as dibutyl ether, tetrahydrofuran, 1,4-dioxane and 1,3,5-trioxane, and nitrogen-containing solvents such as acetonitrile, valeronitrile, N,N-dimethylformamide and N,N-diethylformamide. One type of organic solvent can be used, or a solvent mixture comprising a plurality of two or more types can be used. Furthermore, the solid fraction concentration of the (B) component epoxy group containing resin can be selected within the range where the dispersion stability of the resin is not lost, and generally this solid fraction concentration is from 10 to 70 mass %.

Furthermore, the proportions of the carboxyl groups in the (A) component resin and the epoxy groups in the (B) component epoxy group containing resin are, as a mol ratio, within the range from 75/25 to 25/75, preferably in the range from 65/35 to 35/65 and most desirably in the range from 60/40 to 40/60. In those cases where the ratio of carboxyl groups in the (A) component with respect to the epoxy groups in the (B) component is greater than 75/25 a problem arises in that the hardness of the paint film is reduced, and in those cases where this ratio is smaller than 25/75 again there is a problem in that the hardness of the paint film is reduced.

An (E) component carboxyl group containing resin can be included in a paint composition of this invention. The carboxyl group containing resin which is the (E) component is a resin which has two or more carboxyl groups in one molecule, and it is a carboxyl group containing resin of which the acid value is from 100 to 800 mgKOH/g and the weight average molecular weight is from 200 to 30,000 (but excluding the (A) component). The carboxyl groups of the (E) component may or may not be blocked with a blocking agent. The usual resins such as the carboxyl group containing acrylic resins and polyester resins can be used for the (E) component carboxyl group containing resins, and the blocking agents with which the carboxyl groups can be blocked include vinyl ethers such as propyl vinyl ether and other known blocking agents.

In those cases where the carboxyl groups of the (E) component are not blocked the use of an acrylic resin in which the carboxyl groups comprise only carboxyl groups of acrylic acid origin and carboxyl groups of methacrylic acid origin, as the (A) component, is preferred. In those cases where an acrylic resin comprising only carboxyl groups of acrylic acid origin and carboxyl groups of methacrylic acid origin is not used problems arise in that the storage stability is reduced.

Actual examples of the (E) component acrylic resins include the resins which, in the method of production described for the aforementioned (A) component, do not include structural units based on lactone compounds or the resins where the hydroxyl groups of a hydroxyl group containing acrylic resin have been formed into acid anhydride half-esters, and actual examples of the (E) component polyester resins include the polycarboxyl compounds disclosed in the illustrative examples of Japanese Unexamined Patent Application Laid Open H4-345602 and the latent carboxyl compounds where the carboxyl groups have been blocked with vinyl ether.

The acid value of the (E) component carboxyl group containing resin is preferably from 120 to 400 mgKOH/g, and most desirably from 140 to 300 mgKOH/g. In those cases where the carboxyl groups are not blocked, paint film hardness is lacking with acid values less than 100 mgKOH/g, and if the acid value exceeds 800 mgKOH/g then the compatibility with the other resins is reduced and the appearance of the paint film is poor. Furthermore, in those cases where the carboxyl groups are blocked the paint film harness is similarly lacking if the acid value after elimination is less than 100 mgKOH/g, and if it exceeds 800 mgKOH/g then the compatibility with the other resins is reduced and the appearance of the paint film is poor.

The weight average molecular weight of the (E) component carboxyl group containing resin is from 200 to 30,000, but it is preferably from 400 to 20,000 and most desirably from 600 to 15,000. Paint film hardness is lacking with a weight average molecular weight of less than 200, and if it exceeds 30,000 then the compatibility with the other resins is reduced and the appearance of the paint film is poor.

An (E) component carboxyl group containing resin is used to heighten the reactivity with the (B) component epoxy group containing resin, but it is used in such a way that the proportions of the (A) component carboxyl group containing resin and the (E) component carboxyl group containing resin as the resin solid fraction mass ratio is preferably within the range from 99/1 to 50/50, more desirably in the range from 99/1 to 60/40, and most desirably in the range from 99/1 to 70/30. If the proportion of the (E) component in this resin solid fraction mass ratio exceeds 50 mass % then the storage stability is poor in those cases where the carboxyl groups are not blocked, and on the other hand in those cases where the carboxyl groups are blocked the base concealing properties are poor.

Furthermore, the proportion of the (A) component carboxyl groups and the (E) component hydroxyl groups with respect to the (B) component epoxy groups is, as a mol ratio, preferably within the range from 75/25 to 25/75, more desirably within the range from 65/35 to 35/65, and most desirably in the range from 60/40 to 40/60. In those cases where the ratio of carboxyl groups of the (A) and (E) components with respect to the epoxy groups in the (B) component is greater than 75/25 a problem arises in that the paint film hardness is reduced, and in those cases where it is smaller than 25/75 as well there is a problem in that the paint film hardness is reduced.

In those cases where an (A) component carboxyl group containing resin and an (E) component carboxyl group containing resin are compounded it can be anticipated that the (B) component epoxy group containing resin of this invention will undergo a chemical reaction in the paint film forming process with the (E) component carboxyl group containing resin.

Benzotriazole based compounds, oxalic acid anilide based compounds, triazine compounds, benzophenone based compounds and the like can be used for the (C) component ultraviolet absorbers which are used in the invention. For example, 2-(2-hydroxy-3,5-di(1,1-dimethylbenzyl)-phenyl-2H-benzotriazole, methyl-3-(3-2H-benzotriazol-2-yl)-5-t-butyl-4-hydroxyphenylpropionate and 2-(2'-hydroxy-5'-methacryloxyethylphenyl)-2H-benzotriazole which can be easily copolymerized with other vinyl monomers can be cited as examples of the benzotriazole based compounds. Examples of the oxalic acid anilide based compounds include ethanediado-N-(2-ethoxyphenyl)-N'-(4-isododecyl-phenyl)-oxalic-anilide. Examples of the triazine based compounds include 2-(4-((2-hydroxy-3-didecyloxypropyl)-oxy)-2-hydroxyphenyl)-4,6-bis(2,4-dimethylphenyl)-1,3,5-triazine. Examples of the benzophenone based compounds include 2,2'-dihydroxy-4,4'-dimethoxybenzophenone. One type of ultraviolet absorber can be used alone, or a combination of two or more types can be used.

The (C) component content is preferably from 0.05 to 5 parts by mass, and most desirably from 0.1 to 2 parts by mass, per 100 parts by mass of the resin solid fraction.

The (D) component light stabilizer which is used in the invention of this application has a basicity (pKb) of at least 9, more desirably of at least 11, and most desirably of at least 12. In those cases where the basicity is less than 9 the storage stability is reduced.

The hindered amine based light stabilizers are suitable for the (D) component light stabilizer, and examples of commercial products include Tinuvin 123 and Tinuvin 440 (produced by the Ciba Specialty Chemicals Co.), Sandoboa 3058 (produced by the Kurarianto Co.). One type of (D) component light stabilizer can be used, or a combination of two or more types can be used.

The (D) component content is preferably from 0.05 to 2 parts by mass, and most desirably from 0.1 to 1 part by mass, per 100 parts by mass of resin solid fraction.

Tris(alkoxycarbonylamino)triazines and/or blocked isocyanate compounds can be included in an amount less than 20 mass % of all the resin solid fraction as the (F) compound in a paint composition of this invention. The (F) component content is preferably not more than 15 mass %, and most desirably not more than 10 mass %. The base concealing properties decline in those case where the tris(alkoxycarbo-nylamino)triazine and/or blocked isocyanate compound content exceeds 20 mass %.

The (F) component not only has the effect of reacting with the hydroxyl groups produced by the reaction of the carboxyl groups of the (A) and (E) components with the epoxy groups of the (B) component and, depending on the particular case, the hydroxyl groups included in the (B) component, and raising the crosslink density, but in those cases where it is used as a top-coat paint, for example, it also reacts with the hydroxyl groups included in the underlying base-coat paint and has the effect of raising the strength of adhesion at the interface.

Tris(methoxycarbonylamino)triazine or tris(ethoxycarbo-nylamino)triazine is preferred as the actual tris(alkoxycar-bonylamino)triazine.

The blocked isocyanate compounds which have two or more isocyanate groups in one molecule, for example polyisocyanates such as hexamethylene diisocyanate, phenylene diisocyanate, xylylene diisocyanate and isophorone diisocyanate which have been blocked with an active methylene based blocking agent, such as methyl acetoacetate or dimethyl malonate, or which have been blocked with an oxime-based blocking agent can be cited as actual examples of the blocked isocyanate compounds.

The paint compositions of this invention can be used as they are or with the addition, as required, of one type, or two or more types, of organic solvent, various additives such as surfactants, surface controlling agents, hardening reaction catalysts, anti-static agents, perfumes, de-watering agents and rheology controlling agents such as polyethylene wax, polyamide wax and fine internally crosslinked type resin particles.

The paint compositions of this invention can be used ideally as one-liquid type paints, and they can be compounded with coloring agents such as dyes and pigments and used as colored paints, but they are preferably used as top-coat paint compositions.

Furthermore, the paint compositions of this invention can provide paint films which have excellent base concealing properties in respect of fine roughness on the surface of the object which is being painted.

The method of paint finishing with a top-coat paint of this invention is, for example, a two-coat one-bake type paint finishing method in which a colored base-coat is painted on the base material and a paint composition of this invention is painted on this as a top-coat paint without crosslinking the base-coat, an over-coat paint finishing method in which a colored base-coat is painted on the base material, a mid-coat paint is painted over this without crosslinking beforehand and these two coats are baked at the same time and then a paint composition of this invention is painted on as an over-coat paint and baked, or a paint finishing method in which, in the abovementioned over-coat paint finishing method, a primer paint is painted on to ensure adhesion with the under-coat and a paint composition of this invention is painted on as an over-coat paint without crosslinking beforehand.

The aforementioned colored base-coat paint, mid-coat paint, top-coat paint, over-coat paint and primer paint are applied using the painting machines generally used, such as an air sprayer, an electrostatic air sprayer, a roll coater, a flow coater or a dipping system, or using a brush, a bar-coater or an applicator, after being adjusted to the prescribed viscosity by heating or by the addition of an organic solvent or reactive diluent, as required. From among these methods spray painting is preferred.

The amount of a paint composition of this invention applied is preferably such that the dry film thickness is generally from 10 to 100 μm. In general the paint films obtained by painting with a paint composition of this invention are preferably baked.

Furthermore, the baking temperature should generally be selected appropriately within the range from 120 to 180° C. Moreover, the baking time should generally be selected appropriately within the range from 10 to 60 minutes.

Furthermore, the base material on which a paint composition of this invention is painted may be an organic material or an inorganic material, such as wood, glass, metal, cloth, plastic, foam, elastomer, paper, ceramic, concrete, or plaster board for example. These base materials may have a pretreated surface or a surface on which a paint film has been formed beforehand.

Embodiments have been described so far, but the paint finishing method of this invention is not limited in any way by these embodiments.

The painted objects obtained with paint compositions of this invention include, for example, structures, wooden products, metal products, plastic products, rubber products, processed papers, ceramic products, and glass products. In more practical terms these include automobiles, automobile parts (such as bodies, bumpers, spoilers, mirrors, wheels and internal decorative parts, all made of various materials), metal sheets such as steel sheets, bicycles, bicycle parts, street furniture (such as guard rails, traffic signs, sound deadening walls and the like), tunnel materials (such as side wall plates and the like), ships, railway rolling stock, aircraft, furniture, musical instruments, domestic electrical goods, building materials, containers, office equipment, sports goods and toys for example.

ILLUSTRATIVE EXAMPLES

The invention is described in more practical terms below by means of illustrative examples, but the invention is not limited in any way by these illustrative examples. Moreover, the performance of the paint films obtained with clear paint compositions of this invention was determined in the ways outlined below.

(1) Paint Turbidity

The paint film was observed visually and assessed in accordance with the following criteria:
○: No turbidity seen in the paint film.
Δ: A little turbidity seen in the paint film.
X: The paint film was white and turbid.

(2) Appearance

The paint film was observed visually and assessed in accordance with the following criteria:
○: When a fluorescent lamp was reflected in the paint film it was reflected clearly.
Δ: When a fluorescent lamp was reflected in the paint film the edge (outline) of the fluorescent lamp was slightly blurred.
X: When a fluorescent lamp was reflected in the paint film the edge (outline) of the fluorescent lamp was markedly blurred.

(3) Paint Film Hardness

The paint film hardness was measured in accordance with the scratch hardness (pencil method) of JIS K5600-5-4 (1999).

(4) Acid Resistance

A spot of 40% sulfuric acid aqueous solution (0.2 ml) was placed on a test sheet on the surface of which a paint film had been formed and then it was heated to 60° C. for 15 minutes and rinsed off with water, after and the extent of any remaining trace was observed visually.
○: Virtually no change was seen in the paint film.
Δ: A slight water mark was seen on the paint film.
X: A pronounced water mark was seen on the paint film.

(5) Water Resistance

The color of the unwashed surface of the paint film after exposing a test plate where a paint film had been formed on the surface outdoors in accordance with the weather resistance test method 9.9 of JIS K-5400 (1990) was measured in accordance with the paint film color metering method 7.4.2 of JIS K-5400 (1990) and the ΔL* value was calculated by subtracting the L* value before the test from the L* value after immersing the test plate in warm water at 40° C. for 240 hours and the degree of whitening of the paint film was assessed on the basis of the following criteria.
○: Less than 0.5
Δ: 0.5 or above but less than 1.0
X: 1.0 or above (6) Weather Resistance The state of the paint film was assessed visually after a test plate with the paint film formed on the surface had been exposed for 3000 hours using a sunshine carbon arc lamp type accelerated weather resistance testing machine (JIS K-5400 (1990) 9.8.1).

(7) Base Concealing Properties

The clear paint was painted in such a way as to provide a dry film thickness of 30 μm on a electrodeposition painted steel plate of surface roughness Ra 0.4 and baked and then the appearance of the paint film was assessed visually.
○: The base material roughness was more or less concealed.
Δ: The base material roughness appeared at the clear surface.
X: The base material roughness was not concealed at all.

(8) Storage Stability

Clear paint was diluted with Sorbesso 100 (trade name, produced by the Esso Co., an aromatic petroleum naphtha) to the paint viscosity (Ford Cup. No. 4, 25 seconds at 20° C.) and the storage stability was verified by means of the change in viscosity after storage for 10 days at 30° C.
○: The change in viscosity was within 5 seconds.
Δ: The change in viscosity was at least 5 seconds but less than 10 seconds.
X: The change in viscosity was 10 seconds or more.

Example of Production 1

Production of the Carboxyl Group Containing Resin Solution A-1

Xylene (60 parts by mass) was introduced into a four-necked flask which had been furnished with a thermometer, a reflux condenser, a stirrer and a dropping funnel and heated to and maintained at 140° C. while being stirred under a current of nitrogen. Then a mixture of 11.5 parts by mass of acrylic acid, 11.5 parts by mass of methacrylic acid, 28 parts by mass of n-butyl acrylate, 28 parts by mass of n-butyl methacrylate and 4 parts by mass of polymerization initiator t-butylperoxy-2-ethylhexanoate was added dropwise at a constant rate from the dropping funnel over a period of 2 hours at a temperature of 140° C. After the drip feed had been completed the temperature was maintained at 140° C. for 1 hour and then the reaction temperature was lowered to 110° C. Subsequently, 0.5 part by mass of t-butylperoxy-2-ethylhexanpate polymerization initiator (supplementary catalyst) dissolved in 5 parts by mass of xylene was added and, after maintaining the temperature at 110° C. for 2 hours, 21 parts by mass of ε-caprolactam and 5 parts by mass of xylene were added and the reaction was completed by maintaining the temperature at 150° C. for 3 hours, and the carboxyl group containing resin solution A-1 was obtained. The resin acid value was 157.7, the involatile fraction was 59.6 mass %, and the weight average molecular weight was 8,200.

Examples of Production 2 to 8

Production of the Carboxyl Group Containing Resin Solutions A-2 to A-8

The carboxyl group containing resin solutions A-2 to A-8 were obtained in the same way as in Example of Production 1 except that the monomer composition was changed to those indicated in Table 1. The property values of the resin solutions are shown in Table 1.

TABLE 1

| | | Example of Production | | | | | | | |
|---|---|---|---|---|---|---|---|---|---|
| | | 1 | 2 | 3 | 4 | 5 | 6 | 7 | 8 |
| Carboxyl group containing resin solution | | A-1 | A-2 | A-3 | A-4 | A-5 | A-6 | A-7 | A-8 |
| Initial Introduction | Xylene | 60.0 | 60.0 | 60.0 | 60.0 | 60.0 | 60.0 | 60.0 | 60.0 |
| Drip Feed Component | Acrylic acid | 11.5 | 6.0 | 6.0 | 23.0 | 13.0 | 11.5 | 11.5 | 11.5 |
| | Methacrylic acid | 11.5 | 6.0 | 6.0 | 23.0 | 13.0 | 11.5 | 11.5 | 11.5 |
| | Maleic acid | | | 8.0 | | | | | |
| | n-Butyl acrylate | 28.0 | 29.5 | 33.5 | 16.5 | 26.5 | 28.0 | 38.5 | 10.0 |
| | n-Butyl methacrylate | 28.0 | 29.5 | 33.5 | 16.5 | 26.5 | 28.0 | 38.5 | 10.0 |
| | t-Butylperoxy-2-ethylhexanoate | 4.0 | 4.0 | 4.0 | 4.0 | 12.0 | 1.0 | 4.0 | 4.0 |
| Supplementary Catalyst | t-Butylperoxy-2-ethylhexanoate | 0.5 | 0.5 | 0.5 | 0.5 | 0.5 | 0.5 | 0.5 | 0.5 |
| | Xylene | 5.0 | 5.0 | 5.0 | 5.0 | 5.0 | 5.0 | 5.0 | 5.0 |
| Supplementary Component | ε-Caprolactone | 21.0 | 21.0 | 21.0 | 21.0 | 21.0 | 21.0 | | 57.0 |
| | Xylene | 5.0 | 5.0 | 5.0 | 5.0 | 5.0 | 5.0 | | 5.0 |
| Total | | 174.5 | 174.5 | 174.5 | 174.5 | 182.5 | 171.5 | 169.5 | 174.5 |
| Calculated as Solid Fraction | | 104.0 | 104.0 | 104.0 | 104.0 | 112.0 | 101.0 | 104.0 | 104.0 |
| Resin acids value (mgKOH/g) | | 157.7 | 157.7 | 82.6 | 316.5 | 166.1 | 162.9 | 158.2 | 158.2 |
| Varnish equivalent | | 597.0 | 597.0 | 1140.4 | 297.5 | 550.5 | 584.7 | 577.9 | 595.0 |
| ε-Caprolactone (mass %) | | 20.2 | 20.2 | 20.2 | 20.2 | 18.8 | 20.8 | 0.0 | 54.8 |
| Involatile fraction (mass %) | | 59.6 | 59.6 | 59.6 | 59.6 | 61.4 | 58.9 | 61.4 | 59.6 |
| Weight average molecular weight | | 8200 | 7800 | 8300 | 7900 | 1620 | 36000 | 8200 | 8100 |

Example of Production 9

Production of the Epoxy Group Containing Resin Solution B-1

Xylene (60 parts by mass) was introduced into a four-necked flask which had been furnished with a thermometer, a reflux condenser, a stirrer and a dropping funnel and heated to and maintained at 140° C. while being stirred under a current of nitrogen. Then, a mixture of 53 parts by mass of glycidyl acrylate, 23.5 parts by mass of n-butyl acrylate, 23.5 parts by mass of n-butyl methacrylate and 4 parts by mass of polymerization initiator t-butylperoxy-2-ethylhexanoate was added dropwise at a constant rate from the dropping funnel over a period of 2 hours at a temperature of 140° C. After the drip feed had been completed the temperature was maintained at 140° C. for 1 hour and then the reaction temperature was lowered to 110° C. Subsequently, 1 part by mass of t-butylperoxy-2-ethylhexanoate polymerization initiator (supplementary catalyst) dissolved in 5 parts by mass of xylene was added and the reaction was completed by maintaining the temperature at 110° C. for 2 hours and the epoxy group containing resin solution B-1 was obtained. The resin epoxy value was 199.4, the involatile fraction was 61.8 mass %, and the weight average molecular weight was 7,900.

Examples of Production 10 to 15

Production of the Epoxy Group Containing Resin Solutions B-2 to B-7

The epoxy group containing resin solutions B-2 to B-7 were obtained in the same way as in Example of Production 9 except that the monomer composition was changed to those indicated in Table 2. The property values of the resin solutions are shown in Table 2.

TABLE 2

| | | Example of Production | | | | | | |
|---|---|---|---|---|---|---|---|---|
| | | 9 | 10 | 11 | 12 | 13 | 14 | 15 |
| Epoxy group containing resin solution | | B-1 | B-2 | B-3 | B-4 | B-5 | B-6 | B-7 |
| Initial Introduction | Xylene | 60.0 | 60.0 | 60.0 | 60.0 | 60.0 | 60.0 | 60.0 |
| Drip Feed Component | Glycidyl methacrylate | 53.0 | 53.0 | 21.0 | 85.0 | 53.0 | 53.0 | 52.0 |
| | n-Butyl acrylate | 23.5 | 20 | 39.5 | 7.5 | 23.5 | 23.5 | 11.0 |
| | n-Butyl methacrylate | 23.5 | 20 | 39.5 | 7.5 | 23.5 | 23.5 | 11.0 |
| | 2-Hydroxyethyl methacrylate | | 7 | | | | | 26.0 |
| | t-Butylperoxy-2-ethylhexanoate | 4.0 | 4.0 | 4.0 | 4.0 | 15.0 | 1.0 | 1.0 |
| Supplementary Catalyst | t-Butylperoxy-2-ethylhexanoate | 1.0 | 1.0 | 1.0 | 1.0 | 1.0 | 1.0 | 1.0 |
| | Xylene | 5.0 | 5.0 | 5.0 | 5.0 | 5.0 | 5.0 | 5.0 |
| Total | | 170.0 | 170.0 | 170.0 | 170.0 | 181.0 | 167.0 | 167.0 |
| Calculated as solid fraction | | 105 | 105 | 105 | 105 | 116 | 102 | 102 |
| Resin acid value (mgKOH/g) | | 199.4 | 199.4 | 79.0 | 319.8 | 180.5 | 205.2 | 201.4 |
| Varnish epoxy equivalent | | 455.5 | 455.6 | 1149.9 | 284.1 | 485.1 | 447.6 | 456.2 |
| Resin hydroxyl group value (mgKOH/g) | | 0.0 | 28.8 | 0.0 | 0.0 | 0.0 | 0.0 | 110.1 |
| Involatile fraction (mass %) | | 61.8 | 61.8 | 61.8 | 61.8 | 64.1 | 61.1 | 61.1 |
| Weight average molecular weight | | 7900 | 8100 | 8200 | 8300 | 1560 | 35800 | 7800 |

Example of Production 16

Production of the Carboxyl Group Containing Resin Solution E-1

Pentaerythritol (18 parts by mass), 82 parts by mass of hexahydrophthalic acid anhydride and 60 parts by mass of xylene were introduced into a four-necked flask which had been furnished with a thermometer, a reflux condenser and a stirrer and the mixture was heated, with stirring, and maintained at the reflux temperature for 6 hours. Subsequently, the heating and stirring were continued until the acid value of the mixture (diluted about 50 times with a pyridine/water 9/1 mass ratio mixture, heat treated at 90° C. for 30 minutes and then titrated with standard potassium hydroxide solution) reached 299 mgKOH/g and in this way the carboxyl group containing resin solution E-1 of weight average molecular weight 800 and involatile fraction 62.5% shown in Table 3 was obtained.

Example of Production 17

Production of the Carboxyl Group Containing Resin Solution E-2

Pentaerythritol (13 parts by mass), 56 parts by mass of hexahydrophthalic acid anhydride and 60 parts by mass of xylene were introduced into a four-necked flask which had been furnished with a thermometer, a reflux condenser and a stirrer and the mixture was heated, with stirring, and maintained at the reflux temperature for 6 hours. Subsequently, the heating and stirring were continued until the acid value of the mixture (diluted about 50 times with a pyridine/water 9/1 mass ratio mixture, heat treated at 90° C. for 30 minutes and then titrated with standard potassium hydroxide solution) reached 299 mgKOH/g. Then, the temperature was reduced to 70° C. and 31 parts by mass of n-propyl vinyl ether and 2 parts by mass of xylene were added, with stirring, and the reaction was continued at the same temperature for 4 hours and then the reaction was terminated and cooled immediately and in this way the carboxyl group containing resin solution E-2 of weight average molecular weight 1,100 and involatile fraction 61.7% shown in Table 3 was obtained.

TABLE 3

|  |  | Example of Production | |
|---|---|---|---|
|  |  | 16 | 17 |
| Carboxyl Group Containing Resin Solution |  | E-1 | E-2 |
| Initial Introduction | Xylene | 60.0 | 60.0 |
|  | Pentaerythritol | 18.0 | 13.0 |
|  | Hydrogenated phthalic acid anhydride | 82.0 | 56.0 |
| Supplementary Component | n-Propyl vinyl ether |  | 31.0 |
|  | Xylene |  | 2.0 |
| Total |  | 160.0 | 162.0 |
| Calculated as solid fraction |  | 100 | 100 |
| Resin acid value (mgKOH/g) |  | 299 | 299 |
| Varnish acid equivalent |  | 300 | 304 |
| Involatile fraction (mass %) |  | 62.5 | 61.7 |
| Number average molecular weight |  | 800 | 1100 |

Examples 1 to 10

Preparation of the Clear Paints CC-1 to CC-10

The raw materials indicated in Table 4 were mixed sequentially and stirred to form uniform mixtures and the clear paints CC-1 to CC-10 were obtained.

Comparative Examples 1 to 17

Preparation of the Clear Paint CC-11 to CC-26

The raw materials indicated in Tables 5 and 6 were mixed sequentially and stirred to form uniform mixture and the clear paints CC-11 to CC-26 were obtained.

TABLE 4

|  |  |  | Example | | | | | | | | | |
|---|---|---|---|---|---|---|---|---|---|---|---|---|
|  |  |  | 1 | 2 | 3 | 4 | 5 | 6 | 7 | 8 | 9 | 10 |
| Clear Paint |  |  | CC-01 | CC-2 | CC-3 | CC-4 | CC-5 | CC-6 | CC-7 | CC-8 | CC-0 | CC-10 |
| The (A) Component | Carboxyl Group Containing Resin Solution | A-1 | 100.0 |  | 100.0 | 100.0 | 100.0 | 100.0 | 80.0 | 80.0 | 100.0 | 100.0 |
|  |  | A-2 |  | 100.0 |  |  |  |  |  |  |  |  |
|  |  | A-3 |  |  |  |  |  |  |  |  |  |  |
|  |  | A-4 |  |  |  |  |  |  |  |  |  |  |
|  |  | A-5 |  |  |  |  |  |  |  |  |  |  |
|  |  | A-6 |  |  |  |  |  |  |  |  |  |  |
|  |  | A-7 |  |  |  |  |  |  |  |  |  |  |
|  |  | A-8 |  |  |  |  |  |  |  |  |  |  |
| The (B) Component | Epoxy Group Containing Resin Solution | B-1 | 76.3 | 76.3 | 76.3 | 50.9 | 114.5 |  | 89.9 | 89.5 | 76.3 | 76.3 |
|  |  | B-2 |  |  |  |  |  | 76.3 |  |  |  |  |
|  |  | B-3 |  |  |  |  |  |  |  |  |  |  |
|  |  | B-4 |  |  |  |  |  |  |  |  |  |  |
|  |  | B-5 |  |  |  |  |  |  |  |  |  |  |
|  |  | B-6 |  |  |  |  |  |  |  |  |  |  |
|  |  | B-7 |  |  |  |  |  |  |  |  |  |  |
| The (C) Component | Tinuvin 900 *1 |  | 2.0 | 2.0 | 2.0 | 2.0 | 2.0 | 2.0 | 2.0 | 2.0 | 2.0 | 2.0 |
| The (D) Component | Tinuvin 440 *2 |  | 1.0 | 1.0 |  | 1.0 | 1.0 | 1.0 | 1.0 | 1.0 | 1.0 | 1.0 |
|  | Tinuvin 123 *3 |  |  |  | 1.0 |  |  |  |  |  |  |  |
|  | Tunuvin 292 *4 |  |  |  |  |  |  |  |  |  |  |  |
| The (E) Component | Carboxyl group containing resin solution | E-1 |  |  |  |  |  |  | 19.0 |  |  |  |
|  |  | E-2 |  |  |  |  |  |  |  | 19.0 |  |  |

TABLE 4-continued

|  |  | Example |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| The (F) Component | Tris(alkoxycarbonylamino)triazine 50 mass % solution |  |  |  |  |  |  |  |  | 11.6 |  |
|  | Duranate MF-K60X (60 mass % solution) *5 |  |  |  |  |  |  |  |  |  | 9.7 |
| Total |  | 179.3 | 179.3 | 179.3 | 153.9 | 217.5 | 179.3 | 191.9 | 191.5 | 190.9 | 189.0 |
| (A) Component solid fraction (parts by mass) |  | 59.6 | 59.6 | 59.6 | 60.6 | 61.6 | 59.6 | 47.7 | 47.7 | 59.6 | 59.6 |
| (B) Component solid fraction (parts by mass) |  | 47.1 | 47.1 | 47.1 | 31.4 | 70.7 | 47.1 | 55.5 | 55.3 | 47.1 | 47.1 |
| (E) Component solid fraction (parts by mass) |  |  |  |  |  |  |  | 11.9 | 11.7 |  |  |
| (F) Component solid fraction (parts by mass) |  |  |  |  |  |  |  |  |  | 5.8 | 5.8 |
| Calculated as solid fraction (parts by mass) |  | 106.7 | 106.7 | 106.7 | 92.0 | 132.3 | 106.7 | 115.1 | 114.7 | 112.5 | 112.6 |
| (A) + (E) Carboxyl group/(B) Epoxy group (mol ratio) |  | 50/50 | 50/50 | 50/50 | 60/40 | 40/60 | 50/50 | 50/50 | 50/50 | 50/50 | 50/50 |
| Solid fraction ratio (A)/(E) |  |  |  |  |  |  |  | 80/20 | 80/20 |  |  |

TABLE 5

|  |  |  | Comparative Example |  |  |  |  |  |  |  |
|---|---|---|---|---|---|---|---|---|---|---|
|  |  |  | 1 | 2 | 3 | 4 | 5 | 6 | 7 | 8 |
| Clear Paint |  |  | CC-11 | CC-12 | CC-13 | CC-14 | CC-15 | CC-16 | CC-17 | CC-18 |
| The (A) Component | Carboxyl Group Containing Resin Solution | A-1 |  |  |  |  |  |  | 100.0 | 100.0 |
|  |  | A-2 |  |  |  |  |  |  |  |  |
|  |  | A-3 | 100.0 |  |  |  |  |  |  |  |
|  |  | A-4 |  | 100.0 |  |  |  |  |  |  |
|  |  | A-5 |  |  | 100.0 |  |  |  |  |  |
|  |  | A-6 |  |  |  | 100.0 |  |  |  |  |
|  |  | A-7 |  |  |  |  | 100.0 |  |  |  |
|  |  | A-8 |  |  |  |  |  | 100.0 |  |  |
| The (B) Component | Epoxy Group Containing Resin Solution | B-1 | 40.0 | 153.2 | 82.8 | 77.9 | 78.8 | 76.6 |  |  |
|  |  | B-2 |  |  |  |  |  |  |  |  |
|  |  | B-3 |  |  |  |  |  |  | 192.6 |  |
|  |  | B-4 |  |  |  |  |  |  |  | 47.6 |
|  |  | B-5 |  |  |  |  |  |  |  |  |
|  |  | B-6 |  |  |  |  |  |  |  |  |
|  |  | B-7 |  |  |  |  |  |  |  |  |
| The (C) Component | Tinuvin 900 *1 |  | 2.0 | 2.0 | 2.0 | 2.0 | 2.0 | 2.0 | 2.0 | 2.0 |
| The (D) Component | Tinuvin 440 *2 |  | 1.0 | 1.0 | 1.0 | 1.0 | 1.0 | 1.0 | 1.0 | 1.0 |
|  | Tinuvin 123 *3 |  |  |  |  |  |  |  |  |  |
|  | Tunuvin 292 *4 |  |  |  |  |  |  |  |  |  |
| The (E) Component | Carboxyl group containing resin solution | E-1 |  |  |  |  |  |  |  |  |
|  |  | E-2 |  |  |  |  |  |  |  |  |
| The (F) Component | Tris(alkoxycarbonylamino)triazine 50 mass % solution |  |  |  |  |  |  |  |  |  |
|  | Duranate MF-K60X (60 mass % solution) *5 |  |  |  |  |  |  |  |  |  |
| Total |  |  | 143.0 | 256.2 | 185.8 | 180.9 | 181.8 | 179.6 | 295.6 | 150.6 |
| (A) Component solid fraction (parts by mass) |  |  | 59.6 | 59.6 | 59.6 | 59.6 | 59.6 | 59.6 | 59.6 | 59.6 |
| (B) Component solid fraction (parts by mass) |  |  | 24.7 | 94.6 | 51.1 | 48.1 | 48.7 | 47.3 | 119.0 | 29.4 |
| (E) Component solid fraction (parts by mass) |  |  |  |  |  |  |  |  |  |  |
| (F) Component solid fraction (parts by mass) |  |  |  |  |  |  |  |  |  |  |
| Calculated as solid fraction |  |  | 84.3 | 154.2 | 110.7 | 107.7 | 108.3 | 106.9 | 178.6 | 89.0 |
| (A) + (E) Carboxyl group/(B) Epoxy group (mol ratio) |  |  | 50/50 | 50/50 | 50/50 | 50/50 | 50/50 | 50/50 | 50/50 | 50/50 |
| Solid fraction ratio (A)/(E) |  |  |  |  |  |  |  |  |  |  |

TABLE 6

|  |  |  | Comparative Example |  |  |  |  |  |  |  |
|---|---|---|---|---|---|---|---|---|---|---|
|  |  |  | 9 | 10 | 11 | 12 | 13 | 14 | 15 | 16 |
| Clear Paint |  |  | CC-19 | CC-20 | CC-21 | CC-22 | CC-23 | CC-24 | CC-25 | CC-26 |
| The (A) Component | Carboxyl Group Containing Resin Solution | A-1 | 100.0 | 100.0 | 100.0 | 40.0 | 100.0 | 100.0 | 100.0 | 100.0 |
|  |  | A-2 |  |  |  |  |  |  |  |  |
|  |  | A-3 |  |  |  |  |  |  |  |  |
|  |  | A-4 |  |  |  |  |  |  |  |  |
|  |  | A-5 |  |  |  |  |  |  |  |  |

TABLE 6-continued

|  |  |  | Comparative Example | | | | | | | |
|---|---|---|---|---|---|---|---|---|---|---|
|  |  |  | 9 | 10 | 11 | 12 | 13 | 14 | 15 | 16 |
| The (B) Component | Epoxy Group Containing Resin Solution | A-6 A-7 A-8 B-1 B-2 B-3 B-4 B-5 B-6 B-7 |  81.3 |  75.0 |   76.4 | 117.3 | 76.3 | 76.3 | 20.2 | 339.1 |
| The (C) Component | Tinuvin 900 *1 |  | 2.0 | 2.0 | 2.0 | 2.0 | 2.0 | 2.0 | 2.0 | 2.0 |
| The (D) Component | Tinuvin 440 *2 Tinuvin 123 *3 Tunuvin 292 *4 |  | 1.0 | 1.0 | 1.0 | 1.0 |  1.0 |  | 1.0 | 1.0 |
| The (E) Component | Carboxyl group containing resin solution | E-1 E-2 |  |  |  | 57.1 |  |  |  |  |
| The (F) Component | Tris(alkoxycarbonylamino)triazine 50 mass % solution Duranate MF-K60X (60 mass % solution) *5 |  |  |  |  |  |  |  |  |  |
| Total |  |  | 184.3 | 178.0 | 179.4 | 217.4 | 179.3 | 178.3 | 123.2 | 442.1 |
| (A) Component solid fraction (parts by mass) |  |  | 59.6 | 59.6 | 59.6 | 23.8 | 59.6 | 59.6 | 59.6 | 59.6 |
| (B) Component solid fraction (parts by mass) |  |  | 50.2 | 46.3 | 47.2 | 72.5 | 47.1 | 47.1 | 12.5 | 209.4 |
| (E) Component solid fraction (parts by mass) |  |  |  |  |  | 35.7 |  |  |  |  |
| (F) Component solid fraction (parts by mass) |  |  |  |  |  |  |  |  |  |  |
| Calculated as solid fraction |  |  | 109.8 | 105.9 | 106.8 | 132.0 | 106.7 | 106.7 | 72.1 | 269.0 |
| (A) + (E) Carboxyl group/(B) Epoxy group (mol ratio) |  |  | 50/50 | 50/50 | 50/50 | 50/50 40/60 | 50/50 | 50/50 | 80/20 | 20/80 |
| Solid fraction ratio (A)/(E) |  |  |  |  |  |  |  |  |  |  |

Notes for the Tables
*1) Tinuvin 900: Ultraviolet absorber, trade name, a 20 mass % xylene solution produced by the Ciba Specialty Chemical Co.
*2) Tinuvin 440: Light stabilizer, trade name, a 20 mass % xylene solution produced by the Ciba Specialty Chemical Co., pKb above 12
*3) Tinuvin 123: Light stabilizer, trade name, a 20 mass % xylene solution produced by the Ciba Specialty Chemical Co. pKb 9
*4) Tinuvin 292: Light stabilizer, trade name, a 20 mass % xylene solution produced by the Ciba Specialty Chemical Co. pKb less than 5
*5) Duranate MF-K-60X: Trade name, HDI based blocked polyisocyanate produced by the Asahi Kasei Co., involatile fraction 60 mass %, effective NCO 6.6 mass %

Example 11

Test Piece Production and Investigation of Paint Film Performance

Cationic electrodeposition paint Aqua No. 4200 (trade name, produced by the BASF Coatings Japan Co.) was electrodeposition painted in such a way as to provide a dry film thickness of 20 μm on a zinc phosphate treated mild steel plate and baked for 25 minutes at 175° C. and then the mid-coat paint HS-H300 (trade name, produced by the BASF Coatings Japan Co.) was air-spray painted in such a way as to provide a dry film thickness of 30 μm and baked for 30 minutes at 140° C. Then Belcoat No. 6000 black (trade name, produced by the BASF Coatings Japan Co., color: black) which is a solvent-based base-coat paint was air spray painted in such a way as to provide a dry film thickness of 15 μm and set for 3 minutes at 20° C. and then the clear paint CC-1 diluted to a paint viscosity (Ford cup No. 4, 25 seconds at 20° C.) with Sorbesso 100 (trade name, produced by the Esso Co., aromatic petroleum naphtha) was air spray painted with the wet-on-wet system in such a way as the provide a dry film thickness of 40 μm and baked for 30 minutes at 140° C. and a test piece was obtained. However, in just the case of the test sheets for staining resistance testing the base-coat paint was changed to Belcoat No. 6000 white (trade name, produced by the BASF Coatings Japan Co., color: white).

The paint film performance is shown in Table 7, and a paint film which exhibited excellent car-wash scratching resistance, acid resistance, water resistance, staining resistance and weather resistance, with which turbidity of the paint did not arise and which had a uniform gloss was obtained.

Examples 12 to 20 and Comparative Examples 18 to 33

Test pieces where produced in the same way as in Example 1 except that the clear paints CC-2 to CC-26 were used. The paint film performances are shown in Tables 7 to 9.

TABLE 7

|  | Example | | | | | | | | | |
|---|---|---|---|---|---|---|---|---|---|---|
|  | 11 | 12 | 13 | 14 | 15 | 16 | 17 | 18 | 19 | 20 |
| Clear paint | CC-1 | CC-2 | CC-3 | CC-4 | CC-5 | CC-6 | CC-7 | CC-8 | CC-9 | CC-10 |
| Paint turbidity | ◯ | ◯ | ◯ | ◯ | ◯ | ◯ | ◯ | ◯ | ◯ | ◯ |
| Paint film hardness | HB | F | HB | HB | HB | HB | F | HB | F | F |
| Appearance | ◯ | ◯ | ◯ | ◯ | ◯ | ◯ | ◯ | ◯ | ◯ | ◯ |

TABLE 7-continued

|  | Example | | | | | | | | | |
|---|---|---|---|---|---|---|---|---|---|---|
|  | 11 | 12 | 13 | 14 | 15 | 16 | 17 | 18 | 19 | 20 |
| Base concealing properties | ○ | ○ | ○ | ○ | ○ | ○ | ○ | ○ | ○ | ○ |
| Acid resistance | ○ | ○ | ○ | ○ | ○ | ○ | ○ | ○ | ○ | ○ |
| Water resistance | ○ | ○ | ○ | ○ | ○ | ○ | ○ | ○ | ○ | ○ |
| Weather resistance | ○ | ○ | ○ | ○ | ○ | ○ | ○ | ○ | ○ | ○ |
| Storage stability | ○ | ○ | ○ | ○ | ○ | ○ | ○ | ○ | ○ | ○ |

TABLE 8

|  | Comparative Example | | | | | | | | | |
|---|---|---|---|---|---|---|---|---|---|---|
|  | 18 | 19 | 20 | 21 | 22 | 23 | 24 | 25 | 26 | 27 |
| Clear paint | CC-11 | CC-12 | CC-13 | CC-14 | CC-15 | CC-16 | CC-17 | CC-18 | CC-19 | CC-20 |
| Paint turbidity | ○ | X | ○ | X | ○ | X | ○ | Δ | ○ | X |
| Paint film hardness | 2B | F | 2B | F | B | HB | 2B | F | 2B | HB |
| Appearance | ○ | X | ○ | X | ○ | X | ○ | X | ○ | X |
| Base concealing properties | ○ | — | ○ | — | ○ | — | ○ | ○ | ○ | — |
| Acid resistance | ○ | — | ○ | — | ○ | — | ○ | ○ | ○ | — |
| Water resistance | Δ | — | Δ | — | Δ | — | Δ | ○ | Δ | — |
| Weather resistance | Δ | — | Δ | — | ○ | — | Δ | ○ | Δ | — |
| Storage stability | ○ | X | ○ | Δ | ○ | ○ | ○ | Δ | ○ | Δ |

TABLE 9

|  | Comparative Example | | | | | |
|---|---|---|---|---|---|---|
|  | 28 | 29 | 30 | 31 | 32 | 33 |
| Clear paint | CC-21 | CC-22 | CC-23 | CC-24 | CC-25 | CC-26 |
| Paint turbidity | ○ | ○ | ○ | ○ | ○ | ○ |
| Paint film hardness | F | F | F | HB | 2B | 2B |
| Appearance | ○ | ○ | ○ | ○ | ○ | ○ |
| Base concealing properties | — | ○ | ○ | ○ | ○ | ○ |
| Acid resistance | — | ○ | ○ | ○ | ○ | ○ |
| Water resistance | X | ○ | ○ | ○ | Δ | Δ |
| Weather resistance | — | ○ | ○ | — | Δ | Δ |
| Storage stability | ○ | X | X | ○ | ○ | ○ |

The invention claimed is:

1. A one-liquid paint composition, comprising:
a first carboxyl group containing resin consisting of, in copolymerized form, at least one carboxyl group containing radically polymerizable monomer, at least one lactone, and at least one other radically polymerizable monomer;
an epoxy group containing resin, comprising two or more epoxy groups per molecule, wherein the epoxy group containing resin comprises a copolymer comprising structural units based on an epoxy group containing radically polymerizable monomer and of which the epoxy value is from 140 to 270 mgKOH/g and the weight average molecular weight is from 2,000 to 30,000;
an ultraviolet absorber; and
a light stabilizer having a pKb value of at least 9,
wherein the first carboxyl group containing resin has two or carboxyl groups per molecule, having an acid number of from 100 to 300 mgKOH/g and a weight average molecular weight of from 2,000 to 30,000,
wherein the first carboxyl group containing resin is obtained by a copolymerization reaction to obtain a copolymer resin in which the monomers consist of the at least one carboxyl group containing radically polymerizable monomer and the at least one other radically polymerizable monomer,
wherein the at least one other radically polymerizable monomer is at least one selected from the group consisting of methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate, stearyl methacrylate, styrene, acrylonitrile, methacrylonitrile, acrylamide, methacrylamide, and combinations thereof,
wherein the first carboxyl group containing resin has a content of 5 to 50 weight percent of structural units based on a lactone compound, based on resin solids,
wherein at least 50% of the carboxyl groups of the first carboxyl group containing resin are present in acrylic acid units, methacrylic acid units, or a combination thereof,
wherein the first carboxyl group containing resin is made by a process in which addition reaction of said lactone compound on the carboxyl group containing polymerizable monomer is carried out after the copolymerization reaction, on the copolymer resin, or at the same time as the copolymerization reaction, and
wherein the molar ratio of the carboxyl groups of the first carboxyl group containing resin to the epoxy groups of the epoxy group containing resin is 3:1 to 1:3.

2. The paint composition of claim 1, wherein the epoxy group containing resin comprises hydroxyl groups originating from a hydroxyl group containing radically polymerizable monomer and which has a hydroxyl group value of not more than 60 mgKOH/g.

3. The paint composition of claim 1, further comprising a second carboxyl group containing resin different from the first carboxyl group containing resin, comprising two or more carboxyl groups per molecule, having an acid value from 100 to 800 mgKOH/g and a weight average molecular weight from 200 to 30,000, wherein the weight ratio of the first carboxyl group containing resin to the second carboxyl group containing resin is from 99:1 to 50:50, and wherein the molar ratio of the carboxyl groups of the first and second carboxyl group containing resins to the epoxy groups of the epoxy group containing resin is from 75:25 to 25:75.

4. The paint composition of claim 1, further comprising a tris(alkoxycarbonylamino)triazine, a blocked isocyanate compound, or a combination thereof, in an amount of less than 20 percent by weight, based on resin solids.

5. A method of paint finishing, comprising applying the one-liquid paint composition of claim 1 to an object to produce a painted object.

6. A painted object produced according to the method of paint finishing of claim 5.

7. The composition of claim 1, wherein a change in viscosity of the composition mixed with aromatic petroleum naphtha after 10 days at 30° C. is less than 5 seconds.

8. A one-liquid paint composition, comprising:
a first carboxyl group containing resin consisting of, in copolymerized form, at least one carboxyl group containing radically polymerizable monomer, at least one lactone, and at least one other radically polymerizable monomer;
an epoxy group containing resin, comprising two or more epoxy groups per molecule, wherein the epoxy group containing resin comprises a copolymer comprising structural units based on an epoxy group containing radically polymerizable monomer and of which the epoxy value is from 140 to 270 mgKOH/g and the weight average molecular weight is from 2,000 to 30,000 and wherein the epoxy group containing resin comprises hydroxyl groups originating from a hydroxyl group containing radically polymerizable monomer and which has a hydroxyl group value of not more than 100 mgKOH/g;
an ultraviolet absorber; and
a light stabilizer having a pKb value of at least 9;
wherein the first carboxyl group containing resin has two or more carboxyl groups per molecule, having an acid number of from 100 to 300 mgKOH/g and a weight average molecular weight of from 2,000 to 30,000,
wherein the first carboxyl group containing resin is obtained by a copolymerization reaction to obtain a copolymer resin in which the monomers consist of the at least one carboxyl group containing radically polymerizable monomer and the at least one other radically polymerizable monomer,
wherein the at least one other radically polymerizable monomer is at least one selected from the group consisting of methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate, stearyl methacrylate, styrene, acrylonitrile, methacrylonitrile, acrylamide, methacrylamide, and combinations thereof,
wherein the first carboxyl group containing resin has a content of 5 to 50 weight percent of structural units based on a lactone compound, based on resin solids,
wherein at least 50% of the carboxyl groups of the first carboxyl group containing resin are present in acrylic acid units, methacrylic acid units, or a combination thereof,
wherein the first carboxyl group containing resin is made by a process in which addition reaction of said lactone compound on the carboxyl group containing polymerizable monomer is carried out after the copolymerization reaction, on the copolymer resin, or at the same time as the copolymerization reaction, and
wherein the molar ratio of the carboxyl groups of the first carboxyl group containing resin to the epoxy groups of the epoxy group containing resin is 3:1 to 1:3.

9. The paint composition of claim 8, further comprising a second carboxyl group containing resin different from the first carboxyl group containing resin, comprising two or more carboxyl groups per molecule, having an acid value from 100 to 800 mgKOH/g and a weight average molecular weight from 200 to 30,000, wherein the weight ratio of the first carboxyl group containing resin to the second carboxyl group containing resin is from 99:1 to 50:50, and wherein the molar ratio of the carboxyl groups of the first and second carboxyl group containing resins to the epoxy groups of the epoxy group containing resin is from 75:25 to 25:75.

10. The paint composition of claim 8, wherein the epoxy group containing resin comprises hydroxyl groups originating from a hydroxyl group containing radically polymerizable monomer and which has a hydroxyl group value of not more than 60 mgKOH/g.

* * * * *